United States Patent [19]

Nagata

[11] Patent Number: 4,879,923
[45] Date of Patent: Nov. 14, 1989

[54] STEERING WHEEL

[75] Inventor: Atsushi Nagata, Nagoya, Japan

[73] Assignee: Toyoda Gosei Co., Ltd., Nishikasugai, Japan

[21] Appl. No.: 198,823

[22] Filed: May 25, 1988

[30] Foreign Application Priority Data

May 30, 1987 [JP] Japan .................. 62-136987

[51] Int. Cl.⁴ .......................... B62D 1/04
[52] U.S. Cl. ..................... 74/552; 280/750
[58] Field of Search ............ 74/552, 492; 280/750, 280/777

[56] References Cited

U.S. PATENT DOCUMENTS

| | | | |
|---|---|---|---|
| 3,546,964 | 12/1970 | Barenyi et al. | 74/552 |
| 3,567,246 | 3/1971 | Wilfert et al. | 280/750 |
| 3,589,210 | 6/1971 | Norman | 74/552 |
| 3,641,834 | 2/1972 | Barenyi | 74/552 X |
| 3,675,505 | 7/1972 | Henning | 74/552 |
| 3,800,620 | 4/1974 | Barenyi | 74/552 |
| 3,992,041 | 11/1976 | Vernocchi | 280/750 |
| 4,648,164 | 3/1987 | Hyodo et al. | |
| 4,660,852 | 4/1987 | Katayama et al. | 280/750 |
| 4,709,944 | 12/1987 | Hongo et al. | |

FOREIGN PATENT DOCUMENTS

| | | |
|---|---|---|
| 2614041 | 10/1977 | Fed. Rep. of Germany ..... 280/750 |
| 3546065 | 7/1986 | Fed. Rep. of Germany . |
| 3702847 | 8/1987 | Fed. Rep. of Germany . |
| 59-14573 | 1/1984 | Japan .................. 74/552 |
| 60-9764 | 1/1985 | Japan . |
| 1212639 | 11/1970 | United Kingdom .......... 74/552 |

OTHER PUBLICATIONS

Derwent Publications Ltd., English Abstract-Japan, 85-032954/06.

Primary Examiner—Rodney M. Lindsey
Attorney, Agent, or Firm—Cushman, Darby & Cushman

[57] ABSTRACT

A steering wheel is provided with a core of a ring portion, a boss disposed at the center of the core of the ring portion, and cores of a spoke portion disposed between the core of the ring portion and the boss. A first deformable member is interposed between the boss and cores of the spoke portion so as to couple the boss with the cores of the spoke portion, and is provided with a plurality of arm portions which extend radially from the boss and can be plastically deformed. Further, a second deformable member is fixed to the boss at the upper side or lower side of the first deformable member, and abuts on the first deformable member in the deformed state of the first deformable member and then is plastically deformed.

6 Claims, 6 Drawing Sheets

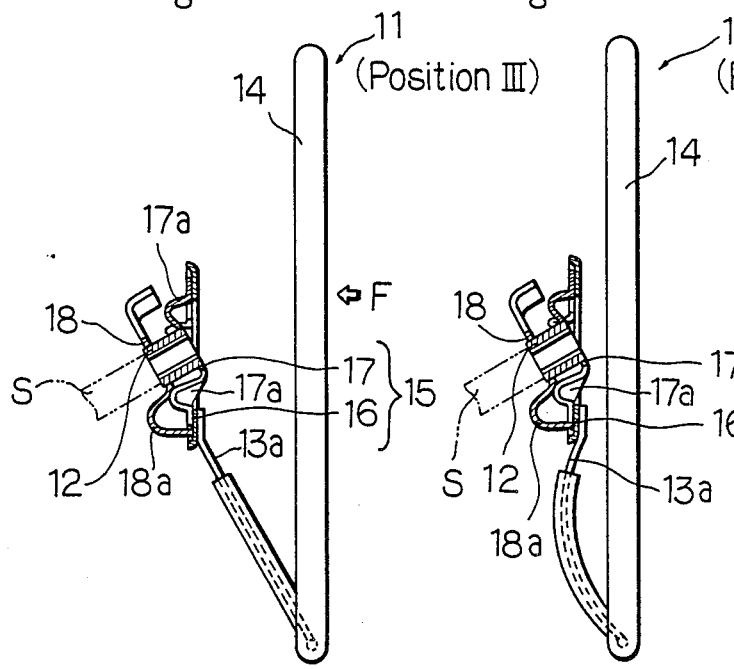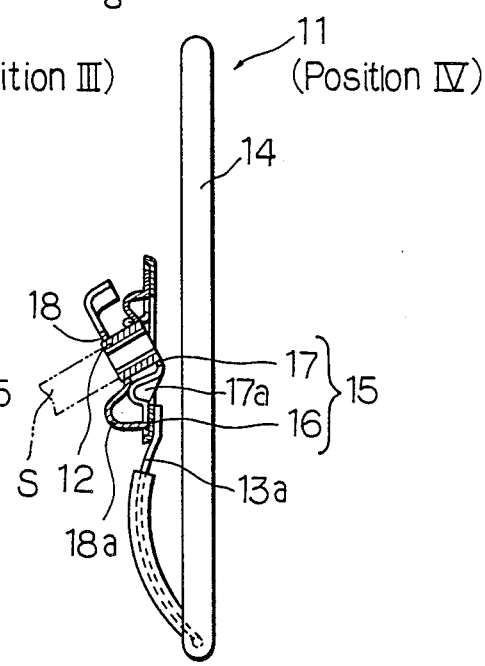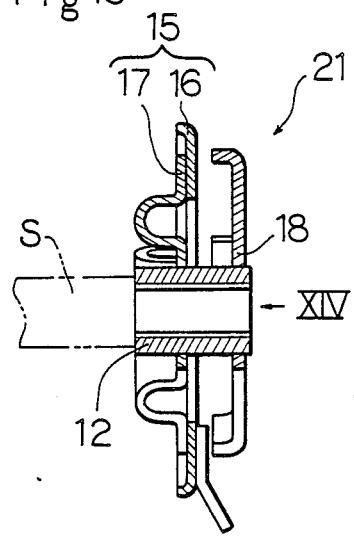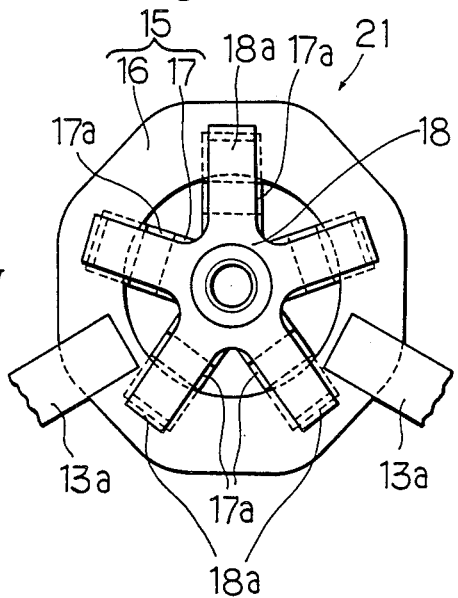

STEERING WHEEL

BACKGROUND OF THE INVENTION

1. Field of the Invention

The present invention relates to a steering wheel for vehicles, provided with a self-aligning mechanism.

2. Description of the Prior Art

In such a steering wheel 1 in the prior art, as shown in FIG. 1, a deformable member 5 comprising an annular plate 6 and a coupling member 7 with a plurality of arm portions 7a is interposed between a boss 2 and a spoke portion 3 (refer to Japanese U.M. application laid-open No. 9764/1985).

In the steering wheel 1, if the impact force F is applied to a ring portion 4 in the horizontal direction, deformation is produced as follows.

First, the deformable arm portions 7a are plastically deformed from the position I shown in FIG. 1, thereby the surface of the ring portion stands nearly in the vertical direction as shown in the position II of FIG. 2.

Subsequently, if the impact force F is further applied to the whole surface of the ring portion, the cores 3a of the spoke portion are plastically deformed thereby the surface of the ring portion approaches the boss 2 as shown in the position III of FIG. 3.

In this case, the deformation of the deformable arm portions 7a and the cores 3a of the spoke portion contributes to the absorbing of energy of the impact force F. FIG. 4 is a graph showing relation between the load and the stoke at the impact state. The area under the line of the graph represents the energy absorbing amount.

In the steering wheel 1 with such a self-aligning mechanism, rigidity of the deformable member 5 is made lower than that of the cores 3a of the spoke portion.

In such a steering wheel 1 in the prior art, in order to increase the energy absorbing amount at the deformed state, the number of the deformable arm portions 7a or the cores 3a of the spoke portion may be increased, or the thickness of these portions may be increased.

In the cores 3a of the spoke portion, however, since the maximum load at the deformed state must be suppressed within limitation, countermeasure by the number or the thickness of the cores 3a of the spoke portion cannot be taken.

Consequently, countermeasure by the number or the thickness of the deformable arm portions 7a is taken.

However, if the number of the deformable arm portions 7a is increased or the thickness thereof is increased, the initial load at the deformed state of the deformable arm portions 7a is increased and the deformation of the deformable arm portions 7a is not liable to occur thereby the self-aligning mechanism may not act smoothly to the position II shown in FIG. 2. Consequently it is preferable that the deformable arm portions 7a are deformed in the low impact force F applied at the initial state.

SUMMARY OF THE INVENTION

An object of the invention is to provide a steering wheel wherein deformation is performed in low value of the initial load at deformed state, and the energy absorbing amount at the deformed state can be increased.

The foregoing object can be attained by a steering wheel comprising a core of a ring portion; a boss disposed at the center of the core of the ring portion; cores of a spoke portion disposed between the core of the ring portion and the boss; a first deformable member interposed between the boss and the cores of the spoke portion to couple the boss with the cores of the spoke portion, and provided with a plurality of deformable arm portions which extend radially from the boss and can be plastically deformed; and a second deformable member fixed to the boss at a lower side or upper side of the first deformable member, the second deformable member abutting on the first deformable member in the deformed state of the first deformable member and then being plastically deformed.

In the steering wheel according to the invention, after assembling it to a vehicle, if the impact force as shown in F of FIG. 8 is applied to a ring portion in the horizontal direction, at the initial state, deformable arm portions of a first deformable member interposed between the boss and cores of a spoke portion are deformed.

When the first deformable member is deformed, a second deformable member installed at an upper side or lower side of the first deformable member abuts on the first deformable member already formed, and is deformed following the deformation of the first deformable member.

After the surface of the ring portion stands nearly in the vertical direction, the cores of the spoke portion are deformed in a manner similar to the steering wheel 1 of the prior art.

That is, in the steering wheel according to the invention, in the initial state that the impact force is applied to the ring portion, since only the first deformable member is deformed in a manner similar to the steering wheel 1 of the prior art, the initial load in the deformed state is not different from the steering wheel 1 of the prior art. After the first deformable member abuts on the second deformable member until the deformation of the cores of the spoke portion is started, in addition to the deformation of the first deformable member, the deformation of the second deformable member is applied, thereby the energy absorbing amount in the deformed state is increased.

Accordingly, in the steering wheel of the invention, the energy absorbing amount in the deformed state can be increased without increasing the initial load in the deformed state.

BRIEF DESCRIPTION OF THE DRAWINGS

FIG. 10 is a fragmentary sectional view of the embodiment illustrating further the deformed state;

FIG. 11 is a fragmentary sectional view of the embodiment illustrating further the deformed state;

FIG. 13 is a fragmentary sectional view of another embodiment;

FIG. 14 is a fragmentary plan view of the embodiment of FIG. 13 viewed from the direction of XIV.

DESCRIPTION OF THE PREFERRED EMBODIMENTS

Embodiments of the invention will be described referring to the accompanying drawings.

Figure 5:
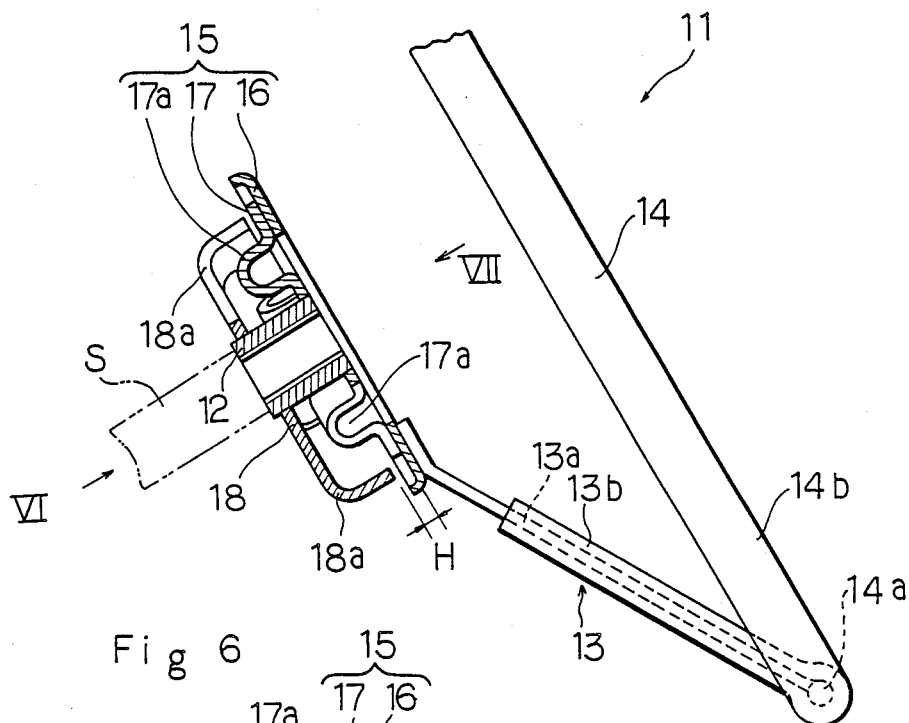
FIG. 5 is a fragmentary sectional view of a steering wheel as an embodiment of the invention.
Figure 6:
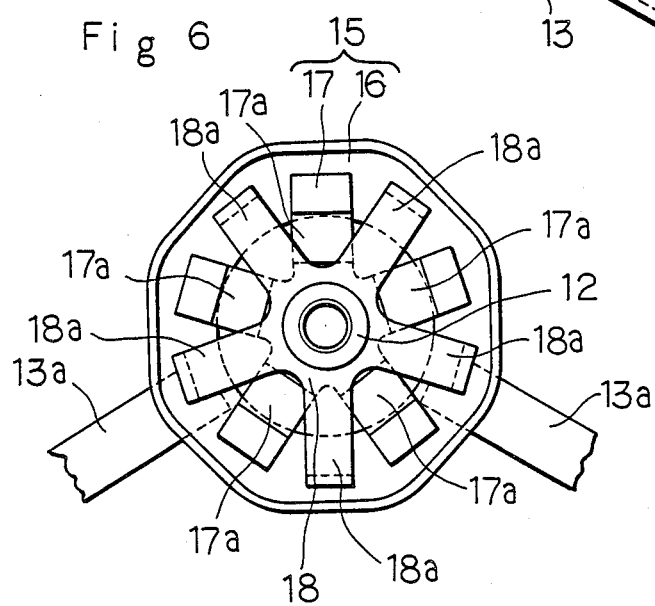
FIG. 6 is a fragmentary plan view of the embodiment of FIG. 5 viewed from the direction of VI.
Figure 7:
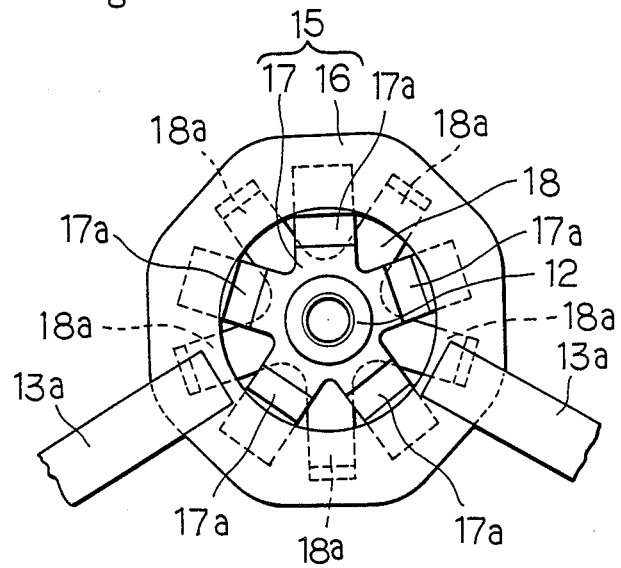
FIG. 7 is a fragmentary plan view of the embodiment of FIG. 5 viewed from the direction of VII.

In a steering wheel 11 of an embodiment shown in FIG. 5, cores 13a of a spoke portion 13 are connected to an annular plate 16 that surrounds a boss 12 utilizing welding or the like as shown in FIGS. 6 and 7. A coupling member 17 is coupled with the boss 12 utilizing welding or the like, and provided with five deformable arm portions 17a which are bent and extended about the boss 12 outward in the radial direction and can be plastically deformed, and the top end of each deformable arm 17 a is coupled with the portion near the inner circumferential edge of the annular plate 16 utilizing welding or the like.

The annular plate 16 and the coupling member 17 which couple the boss 12 and the cores 13a of the spoke portion constitute a first deformable mmber 15 which has a similar composition to that of the deformable member 5 of the steering wheel 1 in the prior art. Both the annular plate 16 and the coupling member 17 are made of steel similarly to the prior art, and the annular plate 16 has high rigidity in comparison to the deformable arm portions 17a of the coupling member 17 or a second deformable member 18 as hereinafter described.

In the steering wheel 11, at the lower side of the deformable member 15 (at the side of a steering shaft S on which the boss 12 is mounted), a second deformable member 18 of steel to be fixed to the boss 12 utilizing welding or the like and being plastically deformable is arranged.

The second deformable member 18 is provided with five deformable arm portions 18a extending about the boss 12 outward in the radial direction, and these deformable arm portions 18a extend between the deformable arm portions 17a of the first deformable member 15 and then are bent upward, and the top end thereof is disposed to the annular plate 16 with a spacing H.

The total rigidity of the first deformable member 15 and the second deformable member 18 is made low in comparison to the rigidity of the cores 13a of the spoke portion.

A coating layer 13b of the spoke portion 13 is made of material having little influence on the plastic deformation of the cores 13a of the spoke portion, such as soft urethane, and a core 14a of the ring portion is connected to the cores 13a of the spoke portion, and further a coating layer 14b of the ring portion 14 is made of the same material as that of the coating layer 13b of the spoke portion. Such composition is similar to that of the steering wheel 1 in the prior art.

Next, the acting mode will be described in which the steering wheel 11 is assembled to the steering shaft S and then the impact force F is applied to the ring portion 14 in the horizontal direction (refer to FIGS. 8-11).

Figure 8:
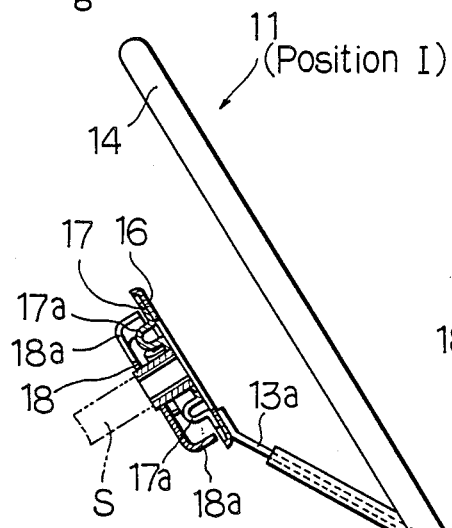
FIG. 8 is a fragmentary sectional view of the embodiment illustrating the state before deformation.
Figure 9:
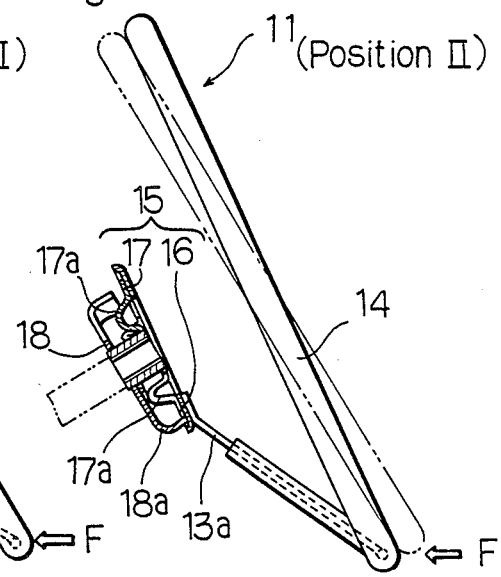
FIG. 9 is a fragmentary sectional view of the embodiment illustrating the deformed state.

When the impact force F is applied to the ring portion 14 in the horizontal direction, the deformable arm portions 17a of the first deformable member 15 are plastically deformed from the position I shown in FIG. 8, and the surface of the ring portion is moved to the position II shown in FIG. 9 so that the lower surface of the annular plate 16 abuts on the top end of the deformable arm portions 18a of the second deformable member 18.

When the impact force F is further applied to the ring portion 14 in the horizontal direction, in addition to the plastic deformation of the deformable arm portions 17a of the first deformable member 15, the deformable arm portions 18a of the second deformable member 18 also are plastically deformed whereby the surface of the ring portion stands nearly in the vertical direction as shown in the position III of FIG. 10.

Subsequently, when the impact force F is further applied to the whole surface of the ring portion in the horizontal direction, the cores 13a of the spoke portion are plastically deformed, whereby the surface of the ring portion approaches the boss 12 as shown in the position IV of FIG. 11.

Figure 12:
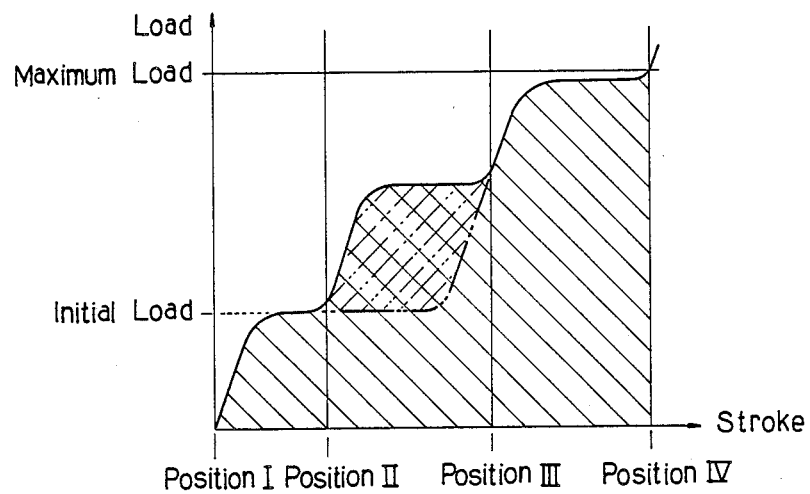
FIG. 12 is a graph illustrating relation between load and stroke in the deformed state of the embodiment.

As above described, energy of the impact force F is absorbed by the plastic deformation of the deformable arm portions 17a, 18a and the cores 13a of the spoke portion, and FIG. 12 is a graph showing the relation between the load and the stroke in this case.

In the steering wheel 11, as shown in FIG. 12, at the initial state that the impact force F is applied to the ring portion 14, since only the deformable portion 17a of the first deformable member 15 is plastically deformed in similar manner to the prior art. the initial load at the deformed state is similar to that of the steering wheel 1 in the prior art.

Figure 1:
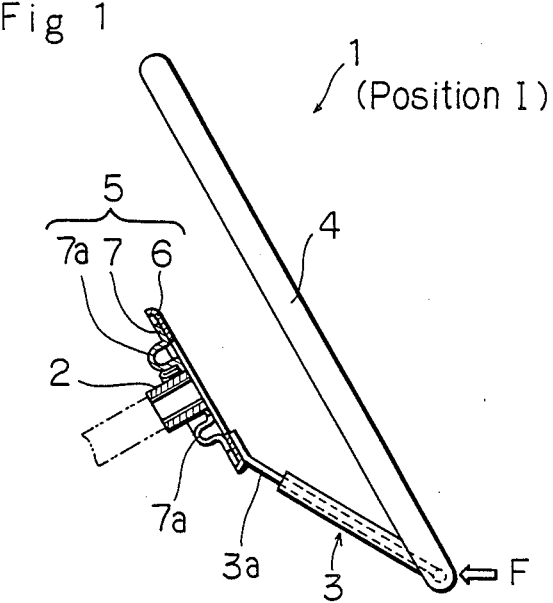
FIG. 1 is a fragmentary sectional view of a steering wheel in the prior art.
Figure 2:
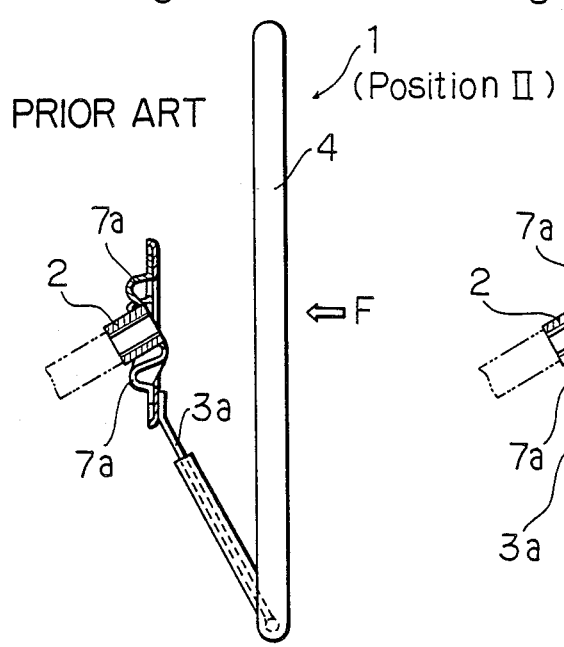
FIG. 2 is a fragmentary sectional view of a steering wheel in the prior art illustrating the deformed state.
Figure 3:
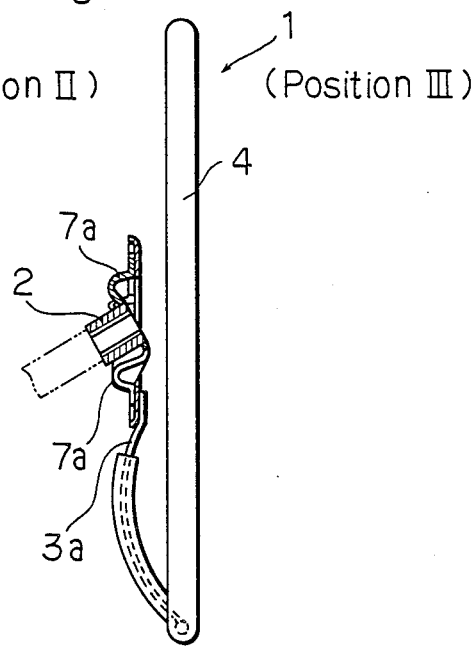
FIG. 3 is a fragmentary sectional view of a steering wheel in the prior art illustrating further the deformed state.
Figure 4:
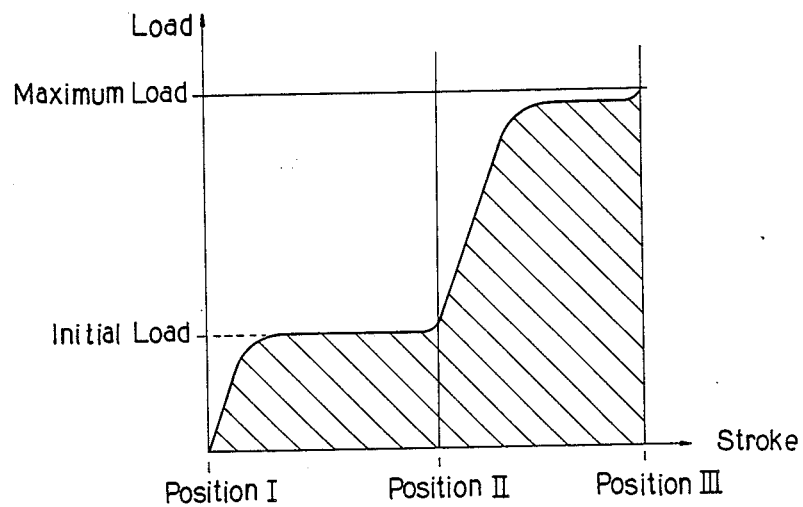
FIG. 4 is a graph illustrating relation between load and stroke in the deformed state of a steering wheel in the prior art.

At the position II where the annular plate 16 of the first deformable member 15 abuts on the deformable arm portions 18a of the second deformable member 18, and later until the position III, in addition to the plastic deformation of the deformable arm portions 17a of the first deformable member 15, the plastic deformation of the deformable arm portions 18a of the second deformable member 18 also is applied. Consequently, the area in the graph of FIG. 12 becomes larger than that of FIG. 4 by the slant line portion of dash-and-dot line shown in FIG. 12. In other words, it follows that the steering wheel 11 of the embodiment absorbs a large amount of the impact energy in comparison to the steering wheel 1 of the prior art.

Consequently, in the steering wheel 11 of the embodiment, the energy absorbing amount at the deformed state can be increased without increasing the initial load at the deformed state.

In the steering wheel 11 of the embodiment, although the second deformable member 18 is installed at the lower side of the first deformable member 15 (at the side of the steering shaft S), as shown in a steering wheel 21 of FIGS. 13 and 14, the second deformable member 18 may be installed on the other side of the first deformable member 15.

Figure 15:
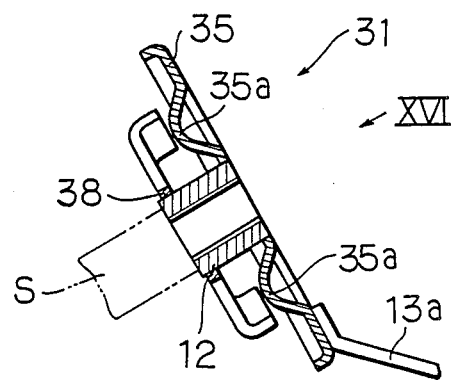
FIG. 15 is a fragmentary sectional view of still another embodiment.
Figure 16:
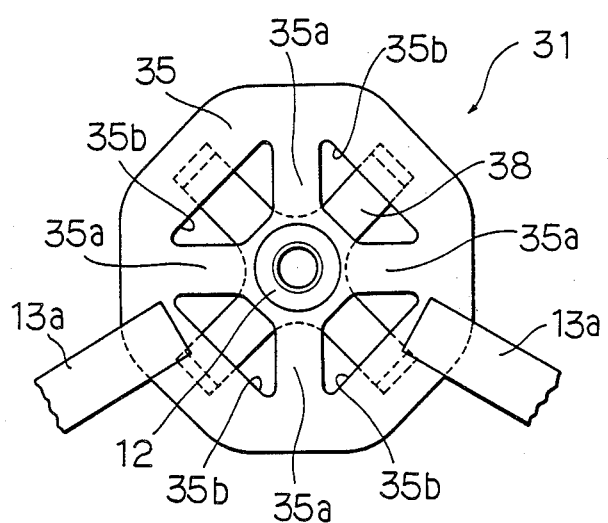
FIG. 16 is a fragmentary plan view of the embodiment of FIG. 15 viewed from the direction of XVI.

Further in the steering wheel 11 of the embodiment, although the first deformable member 15 is constructed using two members, the annular plate 16 and the coupling member 17, as shown in a steering wheel 31 of FIGS. 15 and 16, a first deformable member 35 may be constructed by one steel plate so that the first deformable member 35 can be easily manufactured utilizing press forming or the like. The first deformable member 35 is provided with four holes 35b bored at prescribed positions, and deformable arm pottions 35a are formed between the positions of the holes 35b. Also in the steering wheel 31, although a second deformable member 38 is installed at the lower side of the first deformable member 35 (at the side of the steering shaft S), of course, the second deformable member 38 may be installed at the upper side of the first deformable member 35.

Also in the steering wheel 11 of the embodiment, although the first and second deformable members 15, 18 are made of steel, if utilization of bolting or rivetting does not adversely effect the coupling with the boss 12 or the cores 13a of the spoke portion, material being plastically deformable and light-weight, such as aluminum plate, may be used.

Further in the steering wheel 11 of the embodiment, the deformable arm portions 18a of the second deformable member 18 are disposed respectively at positions between the five deformable arm portions 17a in the first deformable member 15. In this construction, since the deformable arm portions 17a of the first deformable member 15 and the deformable arm portions 18a of the second deformable member 18 do not overlap each other, the height from the second deformable member 18 to the annular plate 16 can be reduced.

What is claimed is:

1. A steering wheel capable of absorbing impact forces comprising:
   (a) a core of a ring portion;
   (b) a boss disposed at a center of said core of the ring portion;
   (c) cores of a spoke portion disposed between said core of the ring portion and said boss;
   (d) a first deformable member interposed between said boss and said cores of the spoke portion for coupling the boss with the cores of the spoke portion, and provided with a plurality of deformable arm portions extending radially from the boss and being plastically deformable; and
   (e) a second deformable member fixed to the boss and disposed a predetermined distance from said first deformable member to allow said first deformable member, upon impact, to deform prior to abutting and continuing to deform along with said second deformable member.

2. A steering wheel as set forth in claim 1, wherein said plurality of deformable arm portions are made a coupling member coupled with said boss;
   a top end of each of said plurality of deformable arm portions is coupled with an annular plate which is coupled with said cores of the spoke portion; and
   said first deformable member is constructed by said coupling member and said annular plate.

3. A steering wheel as set forth in claim 1, wherein said first deformable member is constructed by one plate member; and
   said plurality of deformable arm portions are formed by portions between a plurality of holes bored at prescribed positions in said plate member.

4. A steering wheel as set forth in claim 1, wherein said second deformable member is provided with a plurality of deformable arm portions extending radially from said boss and being plastically deformable; and
   each deformable arm portion of said second deformable member is disposed between respective deformable arm portions of the first deformable member.

5. A steering wheel as set forth in claim 1, wherein said second deformable member is disposed below a lower side of said first deformable member.

6. A steering wheel as set forth in claim 1, wherein said second deformable member is disposed above an upper side of said first deformable member.

* * * * *